United States Patent
Borel et al.

[15] 3,706,406
[45] Dec. 19, 1972

[54] WEB TRANSPORT APPARATUS

[72] Inventors: Robert J. Borel, Rochester; Leonard S. Corey, Victor; Thaddeus W. Kucharski; John L. Stocking, both of Rochester; Frederick H. Thomas, Webster, all of N.Y.

[73] Assignee: Eastman Kodak Company, Rochester, N.Y.

[22] Filed: Jan. 7, 1970

[21] Appl. No.: 6,012

Related U.S. Application Data

[62] Division of Ser. No. 727,558, May 8, 1968, Pat. No. 3,535,212.

[52] U.S. Cl. ..................................................226/95
[51] Int. Cl. .............................................B65h 17/28
[58] Field of Search ......................226/95, 7; 271/74

[56] References Cited

UNITED STATES PATENTS

| | | | |
|---|---|---|---|
| 3,288,037 | 11/1966 | Burnett | 271/74 X |
| 3,477,558 | 11/1969 | Fleischauer | 271/74 X |
| 3,359,648 | 12/1967 | Overly et al. | 271/74 X |

*Primary Examiner*—Allen N. Knowle
*Attorney*—Walter O. Hodsdon, P. R. Holmes and R. L. Randall

[57] ABSTRACT

Apparatus for moving a web above a vacuum chamber comprising a vacuum chamber which has an opening in its upper surface and a foraminous belt movable within the chamber. A portion of the belt moves in the opening to support and move the web from the underside. A vacuum is applied to the vacuum chamber to create a sub-atmospheric pressure under the moving belt to draw the web into contact with the belt as they move together across the vacuum chamber opening.

5 Claims, 4 Drawing Figures

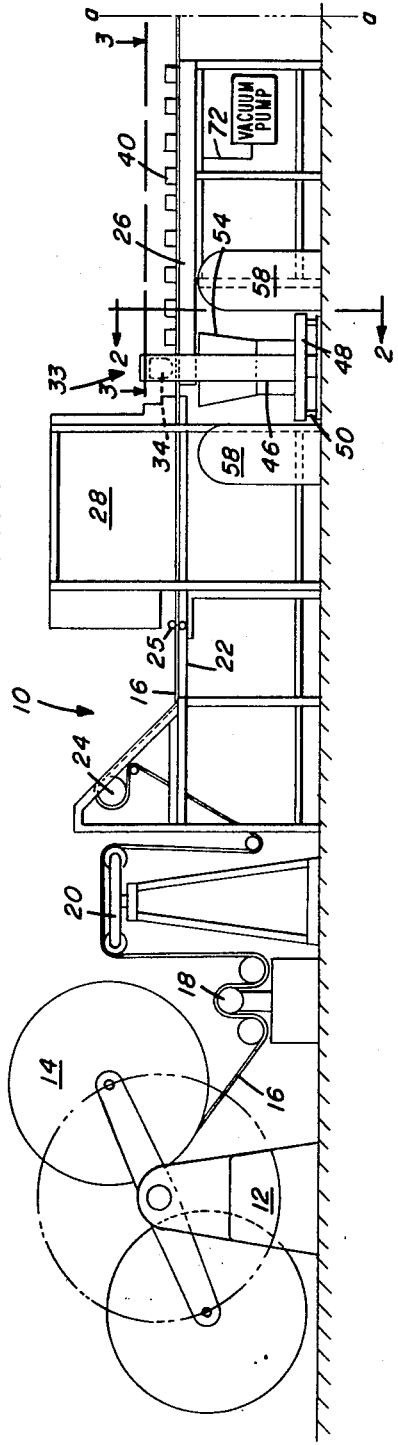
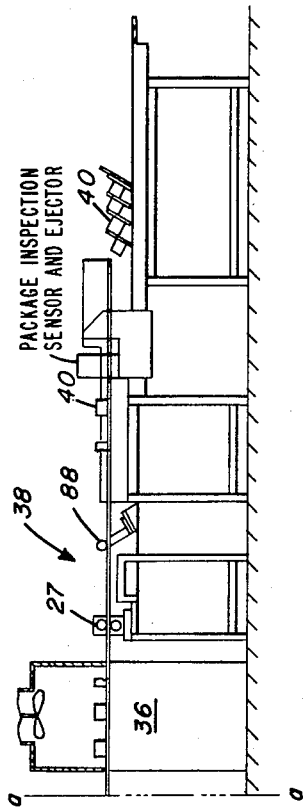

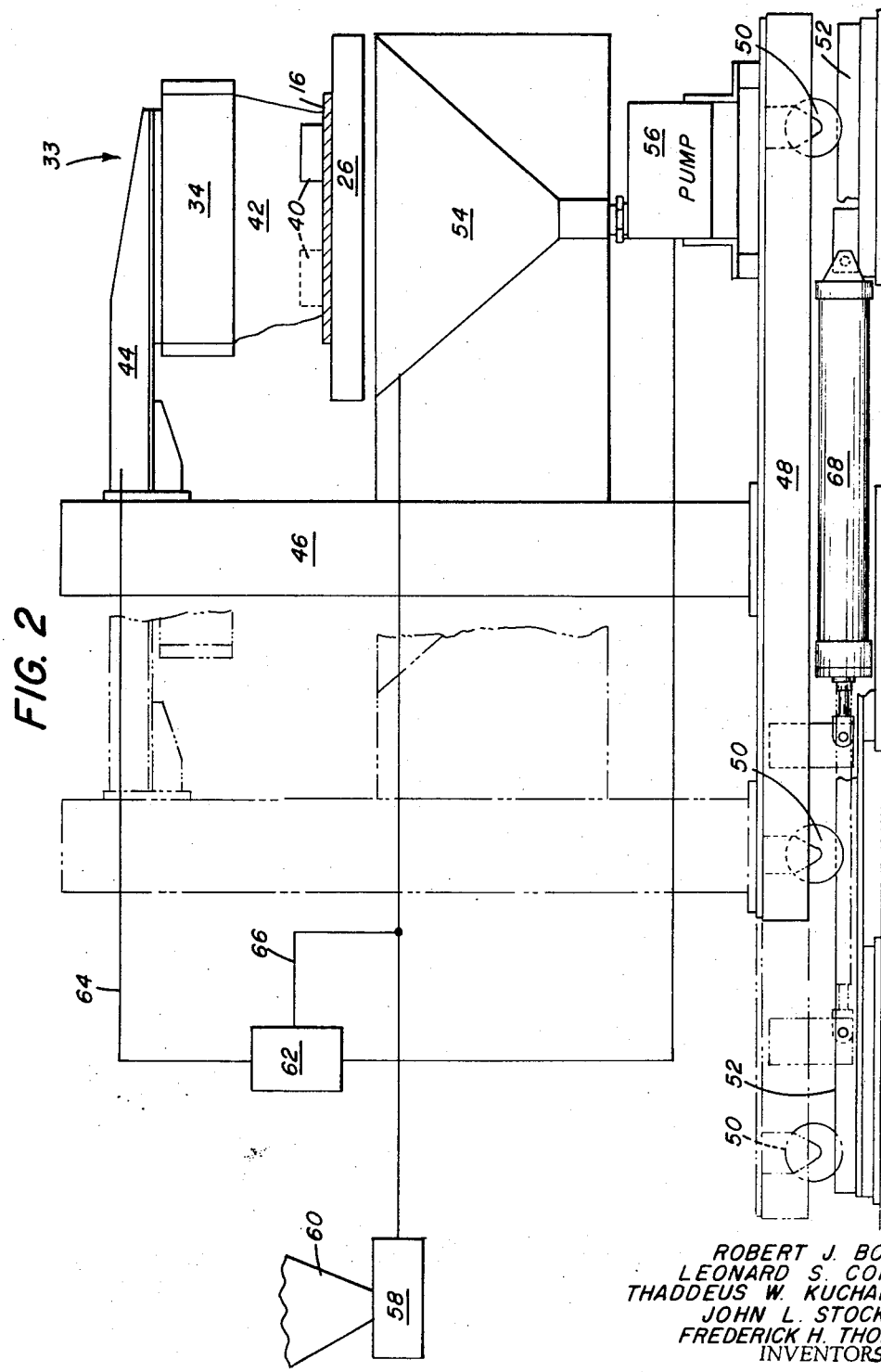

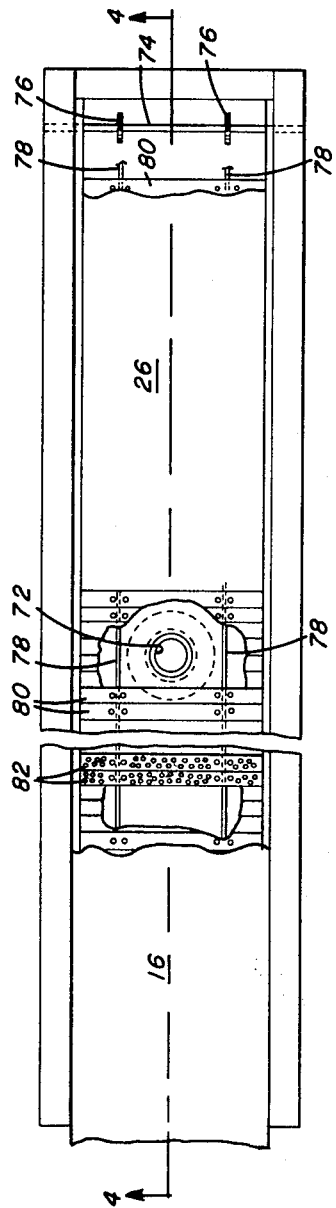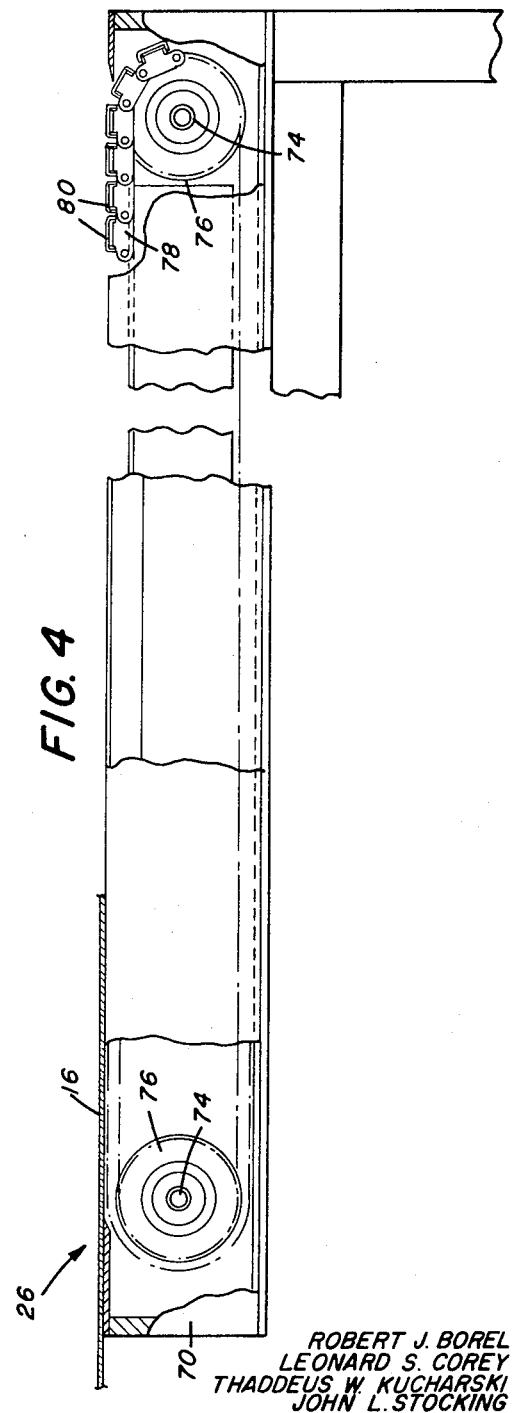

WEB TRANSPORT APPARATUS

This application is a division of U.S. patent application Ser. No. 727,558, filed May 8, 1968, now U.S. Pat. No. 3,535,212.

BACKGROUND OF THE INVENTION

The present invention is directed to apparatus for continuously packaging a plurality of articles by coating them with a plastic sheet or film, and more particularly, it relates to apparatus for continuously curtain coating articles.

Many consumer articles, including food, toys, hardware, toilet goods, and the like are merchandised in plastic packages. These packages include containers molded to fit the article, those in which the film is wrapped around the article, or a combination package made from plastic and another material such as paper or metal foil. In most instances, the plastic serves either as a complete covering or as a window or blister formed in a package made of some other material and permits the consumer to see the article. One of the more recent trends in packaging is to mount the article on a substrate and to apply a transparent plastic film as a coating over the article and the substrate to bind the articles to the substrate.

The general method of curtain coating packaging is described in an article in MODERN PACKAGING, May 1965, entitled, "Skin Pack That Flows On" which describes the process of placing articles to be packaged on a substrate which is sufficiently porous for air to flow therethrough. A vacuum is applied to the lower surface of the substrate, reducing the pressure immediately above it. With the vacuum applied to the lower surface of the substrate, a curtain of viscous, molten thermoplastic material is spread over the articles and the substrate from above. The vacuum causes the curtain to be pulled snugly around the articles and over the upper surface of the substrate. When the thermoplastic material hardens in place, it forms an excellent package for the articles. While the hardened plastic coating adheres well to the substrate, the plastic coating and the substrate are easily separated from the article when the package is to be opened.

In co-pending application Ser. No. 541,413, filed Mar. 2, 1966, in the name of E. Quinn, now abandoned, a process of curtain coating articles is described in which a single substrate sheet, having one or more articles placed on it, is moved into position under a curtain coating extrusion nozzle which, by reciprocating motion longitudinally of the sheet, applies a curtain of plastic material to the substrate to form a coating. The process described therein as an intermittent process. In co-pending application Ser. No. 531,274 filed Mar. 2, 1966, in the name of J. L. Cameron, now abandoned, a process is described for curtain coating individual sheets of substrate with articles placed thereon by employing a rotating table which indexes the assembly of substrate and articles under a curtain coating machine which then applies the coating and permits the coated assembly to be indexed out of position while a new uncoated assembly is indexed into position for the coating operation. This process is likewise intermittent, although it does provide an increased rate of production by employing the indexing mechanism.

The foregoing packaging process is more economical than previous packaging methods in that a stock of preformed packages need not be prepared and stored for use. Moreover, the package prepared by this process is one which binds the article to the substrate in such a fashion that it protects the article from damage. The package also attractively displays the article while providing it with a protective cover. Additionally, this packaging process has great versatility in packaging a wide variety of differently sized and shaped articles with little or no change required in the packaging equipment when shifting from one article to another. Furthermore, this process substantially reduces the amount of article and packaging material handling required. Thus, the speed of packaging may be significantly increased while at the same time costs and manpower requirements are reduced. It should be noted that this type of process is particularly adaptable to high speed production lines. Still further, this packaging process substantially reduces wastage of the packaging material by permitting the recycling and reuse of any material which is not utilized in the initial packaging operation.

In co-pending application Ser. No. 608,607, filed Jan. 11, 1967 in the names of R. Eells, et al., now Defensive publication No. T 857,005, a method and apparatus are described for curtain coating a substantially continuous substrate with the articles to be packaged thereon, having the substrate moving continuously beneath a coating apparatus where molten plastic is applied and then passing over a vacuum apparatus where a vacuum is applied to the underside of the moving substrate. This process is thus continuous, having much higher production rates and lower costs than those noted above. However, the apparatus disclosed by this co-pending application has been found to be limited in the production rate possible as a result of the vacuum section tending to tear the passing substrate. This is apparently due to the manner in which the vacuum is applied to the substrate over a relatively small area at one time, retarding the movement of the substrate. Moreover, it has been found that the mechanism for controlling the width of the plastic coating as it is extruded onto the substrate by trimming the excess plastic stock from the edges of the coating and removing it to a reclamation device is unnecessarily complex and expensive.

SUMMARY OF THE INVENTION Accordingly, the present invention provides an arrangement whereby a vacuum may be applied to a moving web without increasing the force necessary to move the web over the vacuum chamber to an extent that the web may be torn. As a result, the present invention permits operation with substantially less power requirements and greater economy At the same time, the reliability of operation is significantly increased with a reduction in the possibility of tearing the packaging substrate. This in turn permits more automatic operation and a reduction in the number of defective packages produced.

The various features of novelty which characterize the present invention are pointed out with particularity in the claims annexed to and forming a part of this specification. For a better understanding of the inven-

DESCRIPTION OF THE DRAWINGS

FIG. 1 is an elevation view of a preferred embodiment of the present invention;

FIG. 2 is a partially schematic illustration of the coating apparatus taken along line 2—2 of FIG. 1;

FIG. 3 is a plan view, partially in section, of the vacuum chamber of the present invention taken along line 3—3 of FIG. 1; and FIG. 4 is a sectional view of the vacuum chamber taken along line 4—4 of FIG. 3.

DESCRIPTION OF THE PREFERRED EMBODIMENT

The overall operation of this apparatus and process may be readily understood by reference to FIG. 1 in which the apparatus is illustrated and wherein the process moves from left to right past a series of operation-performing stations. The process comprises the sequential steps of supplying an air-permeable substrate, disposing the articles to be packaged on the substrate to form a coatable assembly, coating the assembly and drawing the coating into close contact therewith, and cutting the assembly into individual packages. Thereafter, the individual packages may be stored or shipped.

More particularly, the present packaging apparatus 10 comprises a supply roll stand 12 arranged to hold and feed a roll 14 of an air-permeable web 16, e.g. paper or cardboard, which forms the substrate on which the articles to be packaged are positioned. A tension control assembly 18 is arranged to control the tension of the substrate as it is withdrawn from the supply roll 14 and is pulled through the subsequent operation-performing stations. A web or substrate guide and alignment assembly 20 is disposed downstream of the tension control apparatus 18. These elements are illustrated as being free-standing at one end of a table assembly 22 on which are mounted the remaining elements of the present apparatus; however, it will be understood that the foregoing elements could likewise be mounted on the table assembly.

A vacuum metering roll 24 is disposed at the upstream end of table 22 and comprises a hollow roller having a perforated outer surface. A vacuum is applied to the center of the roller and operates through the perforations to hold the substrate passing thereover in registration therewith. The vacuum metering roll is driven by a motor (not shown) so that it precisely moves the substrate and unreels it from the supply roll 14 through the tension control assembly 18 and the alignment assembly 20. At the same time, the vacuum metering roll and the conveyor drive in the vacuum producing station 26 (described below), in combination with two pair of driven rollers 25 and 27 which grip the substrate, regulate the tension and movement of the substrate throughout subsequent operations.

Following the vacuum metering roll, the substrate passes along the upper surface of table 22 through an article-depositing station 28 where the articles being packaged are either manually or mechanically placed on the substrate. The article-depositing means is arranged to impart a speed to the articles equal to and in the direction of movement of the substrate. In this way the articles may be positively registered with any printed matter that may be incorporated on the substrate. Next, a vacuum-producing station 26 is arranged in the path of the substrate. A coating station 33 is disposed transversely of the moving substrate at the upstream end of the vacuum station and is arranged to extrude a falling curtain of molten thermoplastic over the upper surface of the substrate and the articles thereon. Immediately upon being deposited over the substrate and the articles thereon, the molten thermoplastic curtain is drawn into intimate contact with the articles and the upper surface of the substrate by the vacuum, which is applied to the lower surface of the substrate by the vacuum-producing station. The coated substrate then moves through a cooling station 36 to a slitting and chopping station 38 where the article-supporting substrate is cut into individual packages containing one or more articles. The individual packages are then assembled into storage or shipping containers as desired.

The coating station 33 is illustrated in detail in FIG. 2 and comprises the molten plastic coating head 34 which is suspended above and extends transversely of the moving substrate 16 on which the articles 40 to be packaged are disposed. The coating head 34 is provided with a nozzle opening which delivers a falling curtain 42 of the molten plastic material over the upper surface of the substrate and the articles thereon. The coating head 34 is supported from a cantilever arm 44 extending from the upper end of a support column 46. The support column extends upwardly from a movable frame 48 which rides via wheels 50 on a stationary track 52. A coating reservoir 54 is disposed in alignment with the coating head 34 beneath the moving substrate 16 and the vacuum chamber 26 and is likewise supported by the movable frame 48. The lower end of reservoir 54 is connected to the inlet of a pump 56, which is also supported by the frame 48. As schematically illustrated in FIG. 2, a plastic pre-melter 58 is arranged to accept solid particles of a thermoplastic (such as Eastoflow Butyrate Resin) from hopper 60 and to dispense the molten plastic directly into the reservoir 54. From the reservoir, pump 56 circulates the molten plastic into a velocity gradient separator 62 wherein the molten plastic is separated into a portion which is substantially pure plastic, which is then fed to the coating head 34 via line 64, and an impure portion containing entrained air which is recirculated through line 66 to the reservoir 54.

The plastic utilized as the coating in the present arrangement is in a viscous, molten state when it is discharged from the coating head 34. The curtain 42 is sufficiently fluid that it settles over the upper surface of the substrate 16 and the articles 40 thereon and, under the influence of the vacuum from vacuum chamber 26, is drawn snugly down over the articles to the substrate. Upon cooling, the plastic solidifies and adheres to the upper surface of the substrate. The speed of the substrate moving beneath the coating head 34 may be correlated with the velocity of the curtain 42 being extruded so that a uniform coating is applied to all portions of the substrate. On the other hand, it is possible to regulate the speed of the substrate so that the falling curtain 42 is pulled slightly in the direction of movement of the substrate and articles and is thus stretched to a slight extent, thereby reducing the thickness of the coating.

Frame 48 is movable between two positions by, for example, a hydraulic cylinder 68. The first position, illustrated in FIG. 2 in full, locates the coating head above the moving substrate 16. In this position the reservoir 54 is disposed beneath the vacuum chamber and merely receives molten plastic from the pre-melter 58 and the velocity gradient separator 62 to be recirculated by pump 56. The second position of the coating apparatus, illustrated in phantom in FIG. 2, positions the coating head 34 to one side of the moving substrate. In this position, the falling curtain of molten plastic from the coating head is collected by the reservoir 54 for recirculation by pump 56. Although in normal coating operation all of the falling curtain is deposited on the moving substrate, there are occasions such as system startup or shutdown, or upon a break in the substrate, when the molten plastic cannot be permitted to fall into the end of the vacuum chamber 26. On these occasions the frame 48 is laterally displaced, such as by operation of cylinder 68, so that the coating head 34 and sump 54 are removed from the area over the vacuum chamber. This has been found to permit more expedient, less expensive operation than would be possible if the plastic flow through coating head 34 were stopped, because of the difficulties encountered in subsequently re-establishing uniform plastic flow.

The vacuum applying station or vacuum chamber 26 is shown in detail in FIGS. 3 and 4 and comprises a horizontally extending box-like structure 70 having a rectangular opening in the upper side thereof. The upper surface of the structure is disposed immediately subjacent the plane of the web 16 so that a vacuum produced in the chamber is directly applied to the lower surface of the web. The vacuum may be produced in the chamber by a vacuum pump, not shown, through conduit 72, for example, extending through the bottom of the structure 70. A pair of rotatable shafts 74 extend horizontally through the vacuum chamber at opposite ends thereof. A pair of sprockets 76 are mounted in spaced relationship on each shaft. A foraminous conveyor means is arranged to move in the opening in the upper side of the vacuum chamber. The foraminous conveyor comprises a pair of endless chains 78 extending between the shafts and mounted on the sprockets 76, the chains having a plurality of perforated channel-like members 80 extending therebetween. The channel members 80 have a width substantially equal to the length of each link in the chain and a length substantially equal to the width of the opening in the top of the chamber. The channel members are arranged to move in the opening in the top of the chamber as either or both of the shafts 74 are driven by a power source, not shown.

As may be seen in FIG. 3, each of the channel members is provided with a plurality of holes 82 therethrough. The arrangement of the shafts, sprockets, chains and channel members in the vacuum chamber is such that the upper surface of the channel members 80 on the upper span of the chain 78 is immediately subjacent the lower surface of the web 16 passing over the vacuum chamber. The length of the channel members and the width of the opening in the top of the vacuum chamber are slightly less than the width of the web so that the web slightly overlaps the side of the opening to provide a seal preventing the loss of the vacuum in the chamber. With the perforations provided in the channel members, the vacuum applied to the chamber is also applied to the bottom of the air-permeable web so as to draw the molten plastic coating applied to the upper surface thereof snugly down over the articles disposed thereon. Inasmuch as the web is supported by the channel members which are moved longitudinally of the vacuum chamber by sprockets 76 and chains 78, relatively little stationary friction force is applied to the web so that the possibility of tearing the web is substantially eliminated, as compared to prior art arrangements wherein the web is pulled over a stationary vacuum-transmitting surface.

While the preferred embodiment of the endless belt in the vacuum chamber utilizes the perforated channel members, it will be understood that other flexible foraminous materials such as heavy metal cloth or screening, may also be successfully used.

As the article-bearing coated web is drawn along the length of the vacuum chamber by the moving channel members, the vacuum retains the plastic in contact with the upper surface of the web while the plastic material cools and solidifies. Normally, it has been found that by the time the web reaches the end of the vacuum chamber the plastic has solidified sufficiently to permit further handling without marring the plastic surface. However, it has also been found that under certain conditions the plastic has not completely cooled so that a cooling chamber 36, which directs a stream of cooled air onto the upper surface of the plastic coated web, is necessary. This cooling chamber may be located beyond the end of the vacuum chamber, as shown in FIG. 1, or it may be disposed over the vacuum chamber and operate concurrently therewith.

After cooling, the web is advanced to a slitting and chopping station 38, comprising a rotary cutting knife 88, which is arranged to separate the web into a plurality of individual packages which may contain one or more coated articles. The rotary cutting knife 88 is synchronized with the article depositing means and the moving substrate so that there is no chance that the substrate is cut in the area containing the packaged article. Also included in this station is a package inspection sensor which detects the absence or misplacement of articles. An ejector mechanism is responsive to the sensor to reject packages in which an article is misplaced or missing. The separate articles may then be placed in storage or shipping containers, as desired.

The present invention as described above provides a packaging apparatus which will continuously, rapidly, and economically supply an air-permeable web on which individual articles are placed to be coated with a plastic film which firmly holds the article to the web. Moreover, the present invention provides apparatus which permits substantially increased production rates without increasing the possibility of damaging the substrate. Furthermore, packages are formed which both protect and display the article. In addition, the package provided may be speedily and economically applied to various sized and shaped articles without requiring significant changes in the apparatus.

The invention has been described in detail with particular reference to preferred embodiments thereof, but it will be understood that variations and modifications can be effected within the spirit and scope of the invention as described hereinabove and as defined in the appended claims.

We claim:

1. Apparatus for moving a web along a predetermined path with means for applying a vacuum to the underside of the web comprising a vacuum chamber with an opening in the upper side thereof disposed subjacent the predetermined path of the web, an endless foraminous member disposed within said vacuum chamber and arranged to follow a designated path within the chamber with a first portion of the path traversing the opening in the upper side of the vacuum chamber in the same direction as the movement of the web thereacross and the second portion of the path wholly within the vacuum chamber, drive means for moving said foraminous member along said path, the upper surface of the foraminous member in the open upper side of the vacuum chamber arranged to mate with the lower surface of the web whereby said web is moved from one end of the vacuum chamber to the other while a vacuum is applied to the lower surface thereof.

2. The invention according to claim 1 wherein said foraminous member is comprised of a plurality of perforated channel members.

3. The invention according to claim 2 wherein said perforated channel members are arranged in parallel contiguous relationship transversely in said vacuum chamber.

4. The invention according to claim 2 wherein a pair of endless chains are arranged to follow a predetermined path in the vacuum chamber and to be connected to and to move said perforated channel members.

5. Apparatus for moving a web along a predetermined path with means for applying a vacuum to the underside of the web comprising a vacuum chamber with an opening in the upper side thereof disposed subjacent the predetermined path of the web, said opening having a width less than the width of said web, a pair of endless chains disposed within said vacuum chamber and arranged to follow a designated path within the chamber, a plurality of perforated channel members arranged to permit air to be drawn therethrough connected to and movable with said chains along the designated path, a first portion of the path of the chains and the plurality of perforated channel members arranged to traverse the opening in the upper side of the vacuum chamber in the same direction as the movement of the web thereacross and the second portion of the path wholly within the vacuum chamber, drive means for moving said chains along said path, the upper surface of the channel members in the open upper side of the vacuum chamber arranged to mate with the lower surface of the web whereby said web is moved from one end of the vacuum chamber to the other while a vacuum is applied to the lower surface thereof.

* * * * *